April 9, 1935.  W. McCLINTOCK  1,996,930

CLAY FEEDING DEVICE

Filed April 5, 1933  2 Sheets-Sheet 1

INVENTOR
WILLIAM McCLINTOCK
BY
ATTORNEY

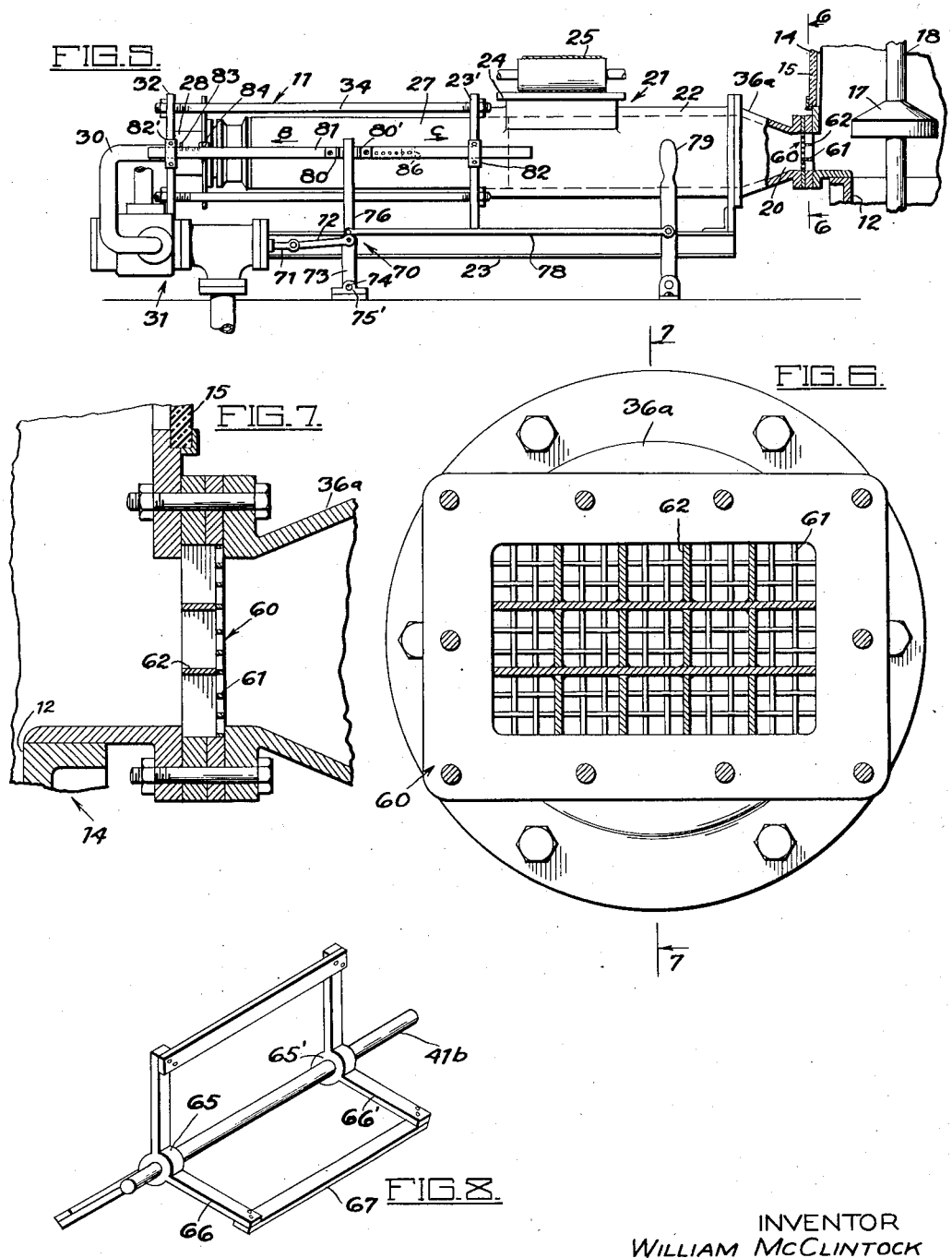

Patented Apr. 9, 1935

1,996,930

UNITED STATES PATENT OFFICE 1,996,930

CLAY FEEDING DEVICE

William McClintock, Los Angeles, Calif., assignor to Pacific Clay Products, a corporation of California Application April 5, 1933, Serial No. 664,540

1 Claim. (Cl. 25—11)

This invention has to do in a general way with clay-working machinery, and is more particularly related to improvements in that portion of a clay-working machine which feeds the clay to the die or mold such as is used in making hollow ware, sewer pipe, and the like.

The general construction of a press of the type with which the feeder, contemplated by this invention, is especially adapted for use, embodies a die which is mounted above an elevator platform adapted to receive the articles extruded therethrough, the die being mounted at the lower end of a vertical press cylinder which contains a piston or pressure head. The clay cylinder, in a device of the type contemplated by this invention, is covered and tightly sealed, and is maintained under vacuum. The cylinder has a suitable clay inlet through which the clay is delivered by means of the feed mechanism without breaking the seal necessary to maintain the vacuum.

In the usual procedure of operating a device of this character, one operator stands on the floor below the die head and controls the movement of the elevator and the pressure head which extrudes the clay through the vertical die. Another operator stands on a platform, or on a floor, at a higher level adjacent the feed mechanism and watches the movement of the press head and controls the feed mechanism. A device of this character, therefore, distinguishes, to a marked extent, from the usual type of continuous operating machine, such as is used in the molding of bricks and the like, in that the feed mechanism must be intermittent in its operation, and the die is arranged to extrude the articles along a vertical axis.

I am aware of the fact that certain attempts have been made to employ auger feeds in connection with clay molding machinery, but such devices have one inherent disadvantage in that the clay propelled by the auger is laminated, such laminations being carried through the die and into the finished article resulting in an inferior product; also it is impossible to properly control an auger machine for effecting an intermittent feed such as is necessary in a vertical type of press of the type embraced herein. My invention, therefore, contemplates, as one object the production of a feed mechanism wherein the clay is forced through a cylinder by means of a reciprocating piston into the upper end of a vertical press of the reciprocating type, the feed cylinder being reduced in size at its discharge end to form a closure consisting of a compact mass of clay for the end of the cylinder.

The device of my copending application, Serial No. 640,615, illustrates the type of device to which my present invention is directed but in that case the feeding device is of a different character and no restriction in the cylinder is contemplated as means are provided for enclosing not only the vertical press but also the feed cylinder and hopper therefor.

It is a primary object of this invention to simplify the feed mechanism for a machine, of the class described, employing a feed cylinder open to the atmosphere but which is so constructed that the use of a reciprocating piston may be used without disturbing the desired conditions, such as vacuum, in the vertical press. This construction has the advantage of reducing the power required to force the clay into the press cylinder in that the atmospheric pressure behind the piston, and the vacuum at the head of the clay column entering the evacuated press cylinder cooperate to move the clay as distinguished from a completely enclosed and evacuated feed cylinder in which the power of the piston alone must be employed to force the clay into the press chamber.

In this connection, it is necessary, in order to maintain a perfect vacuum in the clay cylinder, to incorporate in the feed mechanism a novel type of seal. This invention, therefore, contemplates, as a further object, the production of a feed mechanism of the piston type in which a clay seal is always maintained between the outlet of the feed cylinder and the inlet of the evacuated clay cylinder. This seal is obtained by employing a clay inlet connection which decreases in cross-sectional area from the outlet of the feed cylinder to the inlet of the press cylinder, such connection being effective to choke the clay column so that the frictional resistance offered to the clay by the walls of the connection and the natural resistance offered to the movement of the clay by its compression in the choked connection are effective to always maintain a proper seal.

It is a further object of this invention to produce a feed mechanism of the class described which includes means for disintegrating or breaking up the clay as it enters the press cylinder. In a preferred form of my invention, this disintegration of the clay is accomplished by means of a revolving cutter or shredder which is mounted on an axis that extends transversely across the path of travel of the clay as it enters the press cylinder.

It is a still further object of this invention to produce a disintegrating cutter of this character which is associated with means driven by the "feed" movement of the piston for actuating the cutter.

In another form of my invention, I employ a fixed screen arranged to break up the clay column as it enters the press cylinder, and it is one feature of this construction that means are provided for supporting tthe screen against the pressure action of the clay column as it advances into the press cylinder.

It is a further object of this invention to produce a piston type of clay feeder which is provided with means for stopping the movement of the piston at predetermined points in its travel and at opposite ends of its stroke, the forward movement being controlled so that a body of compound clay is always maintained in the clay delivery or "seal" connection. This last mentioned means is automatic in its action and is associated with manually actuated means for starting the piston in its two opposite movements.

The details in the construction of certain preferred forms of my invention, together with other objects attending its production, will be best understood from the following description of the accompanying drawings which are chosen for illustrative purposes only, and in which—

Fig. 5 is an elevational view with parts broken away showing a feeder which is similar in most respects with the one shown in Figs. 1 and 2, but which is equipped with a modified form of clay disintegrating member;

Fig. 6 is an enlarged sectional elevation taken in a plane represented by the line 6—6 in Fig. 5, and showing further details in the construction of the disintegrating member;

Fig. 7 is a sectional elevation taken in a plane represented by the line 7—7 in Fig. 6; and Fig. 8 is a perspective view showing a modified form of rotary or driven type of cutter which may be used to break up the clay as it enters the vacuum chamber.

Figure 1:
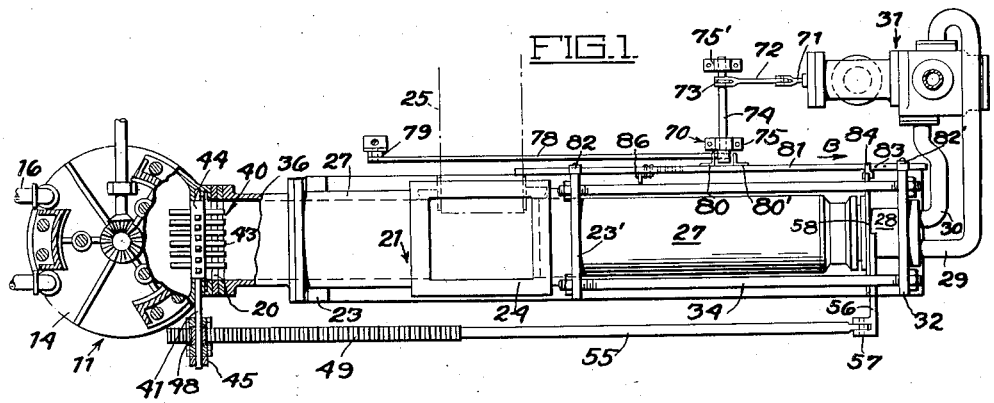
Fig. 1 is a plan view with parts broken away showing a preferred form of the invention.

More particularly describing the invention as herein illustrated, reference numeral 11 indicates a press which I may, for the purpose of description, refer to as a sewer pipe press. This press embodies a vertical cylinder 12 which supports on its lower end a die indicated by reference numeral 13. The upper end of the cylinder 12 is provided with an airtight housing 14 equipped with a window 15, such housing being effective to provide a closed clay cylinder which may be maintained under vacuum. Vacuum is applied to the cylinder through a connection 16.

Reference numeral 17 indicates a piston or pressure head mounted for reciprocation vertically through the cylinder 12. The pressure head 17 is shown as being mounted upon a piston rod 18 which is actuated by any suitable means such as a hydraulic ram (not shown) whereby it is moved downwardly to extrude the clay through the die.

The housing 14 on the press cylinder is shown as being provided near its lower end portion with a clay inlet opening 20 through which clay is delivered into the press cylinder by means of a feed mechanism, generally indicated by reference numeral 21.

The feed mechanism, which forms the essence of this invention, comprises a feed cylinder 22 mounted upon suitable supporting means generally indicated by reference numeral 23, such cylinder being provided with a hopper 24 through which clay is delivered into the cylinder 22 from an ordinary belt conveyor 25. The cylinder 22 receives a piston member 27 which is of the general construction shown in my co-pending application, hereinabove referred to, in that it is hollow and is adapted to reciprocate upon an inner fixed piston member 28, such reciprocation being controlled by hydraulic fluid delivered into and out of the inner fixed piston member through connections 29 and 30 from a valve indicated at 31.

The rear end of the fixed piston member is supported by a rigid standard or a fixed plate indicated at 32 which is secured to the cylinder supporting member 23' through the medium of tie bolts 34.

Reference numeral 36 indicates, what I may term, a clay inlet connection which forms a clay seal at the inlet of the evacuated press cylinder. This connection, as was pointed out in the forepart of the specification, is formed so that its cross-sectional area decreases from the outlet of the feed cylinder to the inlet of the press cylinder, and, in this particular form of my invention, the connection is shown as converging from a round cross-section at the end of the clay feed cylinder to a rectangular cross-section at the entrance of the press cylinder. This connection is effective to seal the vacuum chamber since the clay therein is compressed by the reduction in area so that the atmospheric pressure alone is insufficient to break down the seal under the action of the vacuum on the other side.

It was also pointed out as one object of this invention to provide means for disintegrating the clay as it was forced into the press cylinder from the feed cylinder. In this form of my invention, the disintegration is accomplished by a revolving cutter generally indicated by reference numeral 40 which is shown as comprising a shaft 41 mounted in suitable bearings formed in the press cylinder on an axis which is preferably positioned a substantial distance above the center line of the clay inlet opening 20. In this form of device, the shaft is shown as being situated a slight distance in front of the clay inlet opening and is disposed transversely with the path of travel of the clay entering the press cylinder. That portion of the shaft 41 which extends across the press cylinder is provided with a plurality of knives or blades, of any suitable type, which are designed so as to traverse the path of travel of the clay when the shaft is rotated. Such blades are shown as comprising square bars 43 which extend through or are mounted on a sleeve member 44 and are disposed in two planes in normal relation to each other.

The shaft 41 is provided with an extension 41' which extends through a packing gland 42 in the wall of the press cylinder and the extremity of the extending portion 41' is supported in an overhanging bearing 45, the supporting bracket 45' of which is secured to the wall of the chamber as indicated at 46. The shaft section 41' is provided with a ratchet member 47 adapted for engagement by a pawl 47' mounted in a pinion 48. The pinion 48 engages a rack 49 which is supported by a guide cradle 50, such cradle having its bearings on the shaft as indicated at 51 and 51'.

Figure 2:
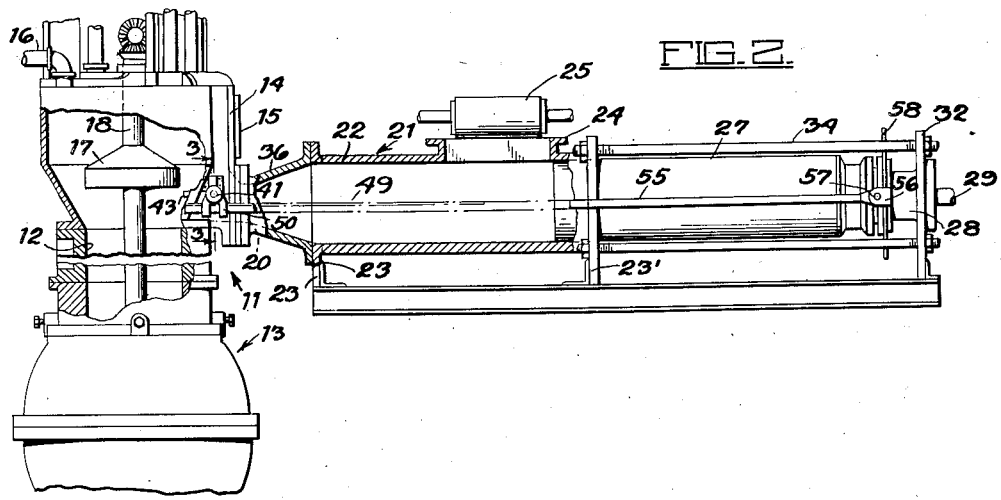
Fig. 2 is an elevational view partly broken away illustrating further details in the construction of the device shown in Fig. 1.
Figures 3, 4:
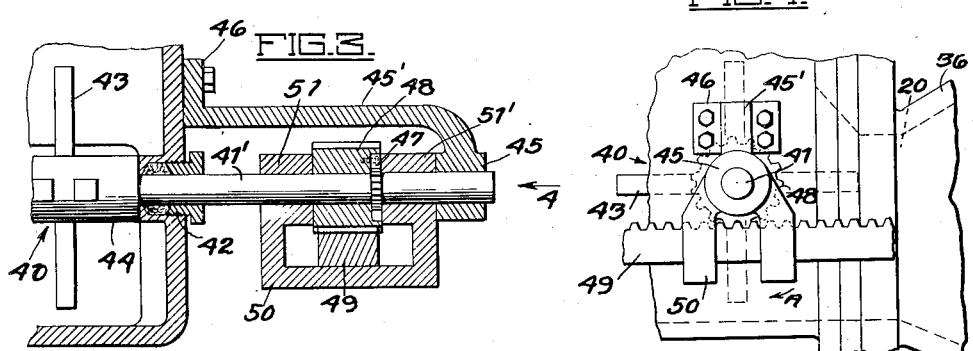
Fig. 3 is a fragmentary enlarged section taken in a plane represented by the line 3—3 in Fig. 2.
Fig. 4 is an outside elevation taken in the general direction of the arrow 4 in Fig. 3.

As is best illustrated in Figs. 1 and 2, the rack 49 is formed on a bar 55, such bar being attached to an arm 56 as indicated at 57, the arm in turn being mounted upon a plate 58 which is carried by the rear end of the traveling piston or ram member. The arrangement of the rack, pinion, and pawl is such that during the forward movement of the ram or piston, the cutter shaft is rotated in the general direction of the arrow A in Fig. 4 so that the knives or bars 43 break up the clay and at the same time force the clay downwardly toward the lower portion of the press cylinder.

In Figs. 5 to 7 inclusive, I show a feeder unit which in all respects, except for the means of breaking up the clay, is identical with the unit described in connection with Figs. 1 and 2. The parts of the unit shown in Fig. 5, similar to those shown in Figs. 1 and 2, are indicated by the same reference characters.

In the form shown in Fig. 5, the clay disintegrating unit 60 is shown as comprising a screen 61 positioned over the outlet opening of the clay delivery section 36a. This screen is supported against the pressure action of the clay as it is moved through the delivery opening into the press cylinder by means of a reinforcing grid member 62. In this form of my invention, the delivery connection 36a constitutes a seal like the delivery connection 36 in Figs. 1 and 2, and is effective to compress the clay and hold it against movement when the piston is withdrawn. The screen and the grid, in this form of my invention, however, replace the revolving cutter shown in Figs. 1 and 2, and are effective to break up the clay column or disintegrate it so that the vacuum in the vacuum chamber is effective to completely remove the air from the clay before it is extruded through the die.

In Fig. 8, I show a modified form of revolving cutter which may be used instead of a cutter of the type shown in Figs. 1 to 4 inclusive, the cutter shown in Fig. 8 comprising a shaft 41b which has mounted thereon in spaced relation with each other, a pair of hub members 65 and 65', such hub members carrying spokes 66 and 66' and the corresponding spokes are connected at their outer ends with blades 67.

It was also pointed out as one object of this invention to provide a piston or ram type of feed mechanism of the class described with means for automatically stopping the ram at the two extremities of its travel. Such means are indicated by reference numeral 70 in Figs. 1 and 5. In this connection it is to be understood that Fig. 2, which is an elevational view of the device shown in Fig. 1, was drawn to illustrate the rack mechanism which is on the side opposite the control 70. Since this control is the same for the device as shown in both Figs. 1 and 5, the same reference characters are applied to the control in both of these figures.

As was pointed out above, the movement of the piston or the hydraulic ram is controlled through the medium of a valve 31. The details in the construction of a preferred form of valve of this nature, are shown in my co-pending application, suffice it to say that the valve is provided with one port for imparting forward movement to the ram, another port which imparts rearward movement to the ram, and is constructed so as to have a neutral position at which the ram is stopped.

The purpose of the control 70 is to stop the valve in its neutral position when the ram has reached predetermined points in its two movements.

Referring more particularly to the construction of the control mechanism, reference numeral 71 indicates a valve control rod which is connected through a link 72 to a rod actuating lever 73. The lever 73 is keyed to a shaft 74 supported by bearings 75 and 75' and the inner end of the shaft 74 has another lever member 76 rigidly secured thereon. The lever member 76 is connected through a link 78 to a manual operating lever 79.

The upper end of the lever member 76 is positioned between a pair of brackets 80 and 80' mounted on a reciprocating bar 81 which is supported by guide members 82 and 82'. The rear end of the bar 80 is provided with an upright pin 83 which may be adjusted in various positions along the length of the bar and is adapted to be engaged by a finger 84 on the plate which is carried by the rear end of the piston for moving the bar in the direction of the arrow B (Fig. 5) as the piston reaches its rearmost position, such movement continuing until the lever member 76 has advanced to a point at which the valve is thrown into neutral and the piston is stopped. After the manual lever 79 is next moved to open the valve for advancing the piston, the plate is carried forward until it strikes a projection 86 adjustably mounted on the inner side of the bar and the continued movement of the piston after such engagement is effective to move the bar in the direction of the arrow C until the lever member 76 is swung into neutral again to stop the piston. The position of the stop 86 is such that the piston is stopped before it jams into the tapered seal connection 36. This not only prevents possible damage to the piston and the connection, but it also maintains a body of compressed clay in the connection which forms a closure and acts as a seal.

It is to be understood that, while I have herein described and illustrated one preferred form of my invention, the invention is not limited to the precise construction described above, but includes within its scope whatever changes fairly come within the spirit of the appended claim.

I claim as my invention:

In combination with a vertical clay press having an evacuated press cylinder provided with a clay inlet opening, means for feeding clay into said press cylinder embodying: a feed cylinder; a hopper on said feed cylinder; a piston in said feed cylinder; means for reciprocating said piston; a delivery connection mounted between the outlet of said feed cylinder and the inlet of said press cylinder, said delivery connection decreasing in cross-sectional area from said feed cylinder to said press cylinder thereby compressing the clay therein to form a seal; and means for disintegrating said clay as it enters said press cylinder, said last mentioned means comprising a shaft mounted across said press cylinder adjacent said inlet opening, blades on said shaft extending into the path of travel of clay entering said press cylinder, a pinion on an extending end of said shaft, a rack engaging said pinion, and an arm on said piston attached to said rack for imparting reciprocating motion to said rack from said piston.

WILLIAM McCLINTOCK.